(12) United States Patent
Adams, Jr. et al.

(10) Patent No.: US 7,257,271 B2
(45) Date of Patent: Aug. 14, 2007

(54) NOISE REDUCTION IN COLOR DIGITAL IMAGES USING PYRAMID DECOMPOSITION

(75) Inventors: James E. Adams, Jr., Rochester, NY (US); John F. Hamilton, Jr., Rochester, NY (US); Frances C. Williams, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 693 days.

(21) Appl. No.: 10/738,658

(22) Filed: Dec. 17, 2003

(65) Prior Publication Data

US 2005/0134734 A1  Jun. 23, 2005

(51) Int. Cl.
  *G06K 9/40* (2006.01)
(52) U.S. Cl. ............... 382/275; 382/167; 382/260
(58) Field of Classification Search ................ 382/275
  See application file for complete search history.

(56) References Cited

U.S. PATENT DOCUMENTS

| 4,982,277 | A | * | 1/1991 | Katoh et al. ............ 358/520 |
| 5,049,985 | A | * | 9/1991 | Outa ..................... 358/530 |
| 5,146,328 | A | * | 9/1992 | Yamasaki et al. ........ 348/675 |
| 5,189,511 | A | * | 2/1993 | Parulski et al. ......... 358/518 |
| 5,408,342 | A | * | 4/1995 | Kumada et al. .......... 358/518 |
| 5,461,655 | A | * | 10/1995 | Vuylsteke et al. ....... 378/62 |
| 5,488,374 | A | | 1/1996 | Frankot et al. |
| 5,526,446 | A | | 6/1996 | Adelson et al. |
| 5,572,329 | A | * | 11/1996 | Otsubo et al. .......... 358/296 |
| 5,579,090 | A | * | 11/1996 | Sasanuma et al. ........ 399/49 |
| 5,644,662 | A | * | 7/1997 | Vuylsteke .............. 382/302 |
| 5,717,791 | A | * | 2/1998 | Labaere et al. ......... 382/274 |
| 5,729,631 | A | | 3/1998 | Wober et al. |
| 5,831,744 | A | * | 11/1998 | Kataoka ................ 358/296 |
| 5,963,676 | A | | 10/1999 | Wu et al. |
| 6,480,610 | B1 | * | 11/2002 | Fang et al. ............ 381/321 |
| 6,563,946 | B2 | * | 5/2003 | Kato ................... 382/166 |

(Continued)

OTHER PUBLICATIONS

Stupák, C., "Filtering of the Color Images Distorted by Impulse Noise", Radioengineering, vol. 10, No. 3, Sep. 2001, <URL: http://www.urel.feec.vutbr.cz/RADIOENG/2001/01_03_21_27.pdf>.*

(Continued)

*Primary Examiner*—Matthew C. Bella
*Assistant Examiner*—Sath V. Perungavoor
(74) *Attorney, Agent, or Firm*—Raymond L. Owens

(57) ABSTRACT

A method of removing noise from a color digital image, including receiving an original color digital image including a plurality of pixels represented in a primary-color space; producing at least one residual digital image and at least one base digital image from the original color digital image, the base digital image having a lower spatial resolution then the original color digital image; producing a noise reduced base digital image by removing noise from the residual image and the base digital image with a noise reduction filter and combining the noise reduced base digital image with the noise reduced residual image to produce a reconstructed digital image having reduced noise; transforming the reconstructed digital image into a luminance-chrominance color space; repeating the above process to produce a reconstructed luminance-chrominance digital image; and transforming the reconstructed luminance-chrominance digital image into a noise reduced digital image in the original primary color space.

7 Claims, 11 Drawing Sheets

U.S. PATENT DOCUMENTS

| | | | |
|---|---|---|---|
| 6,731,797 B2* | 5/2004 | Prentice | 382/167 |
| 6,807,300 B1* | 10/2004 | Gindele et al. | 382/167 |
| 7,181,086 B2* | 2/2007 | Gindele et al. | 382/265 |
| 7,181,091 B2* | 2/2007 | Yoda | 382/309 |
| 7,184,171 B2* | 2/2007 | Hara | 358/1.9 |
| 2001/0045988 A1* | 11/2001 | Yamauchi et al. | 348/273 |
| 2002/0037101 A1* | 3/2002 | Aihara | 382/167 |
| 2002/0118887 A1* | 8/2002 | Gindele | 382/260 |
| 2002/0186390 A1* | 12/2002 | Hara | 358/1.9 |
| 2003/0044061 A1* | 3/2003 | Prempraneerach et al. | 382/164 |
| 2003/0095197 A1* | 5/2003 | Wheeler et al. | 348/241 |
| 2003/0228064 A1* | 12/2003 | Gindele et al. | 382/260 |
| 2004/0096103 A1* | 5/2004 | Gallagher et al. | 382/167 |
| 2006/0038899 A1* | 2/2006 | Tamaru et al. | 348/241 |

OTHER PUBLICATIONS

Aiazzi, B., Alparone, L., Baronti, S., Borri, G., "Pyramid-Based Multiresolution Adaptive Filters for Additive and Multiplicative Image Noise", Circuits and Systems II: Analog and Digital Signal Processing, IEEE Transactions on [see also Circuits and Systems II: Express Briefs, IEEE Transactions on], Aug. 1998, vol. 45, Issue: 8, ISSN: 1057-7130.*

* cited by examiner

NOISE REDUCTION IN COLOR DIGITAL IMAGES USING PYRAMID DECOMPOSITION

FIELD OF THE INVENTION

The invention relates generally to the field of digital image processing, and in particular to noise reduction in color digital images.

BACKGROUND OF THE INVENTION

There are many approaches to reducing the presence of noise in digital images. In order to minimize the required amount of computing resources needed, most commercial approaches to noise reduction in digital images are based on using very small regions of the image for each set of noise reduction computations. One of the simplest approaches with practical value is to use a 3×3 square region of pixels centered on the pixel to be noise reduced. This region is known in the literature as a pixel neighborhood or a support region. With only nine pixel values in the neighborhood available for computational purposes, a variety of algorithms can be used for producing a noise-reduced pixel value without undue burden on most computational resources. If the predominant nature of the noise signal being reduced consists of isolated erroneous pixel values, this pixel neighborhood size is generally sufficient for most noise reduction schemes. If the noise signal is more complex, however, and has clumps of erroneous pixel values that are several pixels wide in extent, the 3×3 square region of pixels will probably be insufficient for adequate noise reduction. The 3×3 square region will still permit the reduction of isolated erroneous pixel values, but will be largely ineffective on larger clumps of noise, especially if said clumps are larger than the 3×3 square region itself. The obvious solution is to increase the size of the noise reduction support region. This is generally a viable alternative up to the point at which the additional burden on the computational resources becomes unacceptable. Unfortunately, it is common for the computational limits of the system to be reached before the support region has been allowed to expand to the desired dimensions for adequate noise reduction.

A solution to these computational limitations is to decompose the image to be noise reduced into a series of images with varying spatial resolutions. In the literature this is described as performing a Laplacian pyramid decomposition. The process is simple. The starting image at its initial spatial resolution is referred to as a base image. A copy of the base image is blurred and then subsampled to a lower resolution. This lower resolution image is a new base image at the next level of the pyramid. This process can be repeated until there are insufficient pixels for any subsequent subsampling operation. A residual image is associated with each base image. In order to create the residual image for a given level of the pyramid, the lower resolution base image from the adjacent level of the pyramid is upsampled and subtracted from the base image at the given level of the pyramid. This difference image is called a residual image. A fully decomposed image consists of a set of base images and corresponding residual images. The advantage of this representation of the image is that small support region image processing operations can be applied to each of the base and/or residual images so as to produce the same results as using a very large support region operation at the original image resolution. In the case of noise reduction, this permits the use of, for example, 3×3 square regions at each level of the pyramid to effectively noise reduce larger and larger clumps of noise. Once the individual images of the pyramid have been processed, the image decomposition process is essentially run in reverse order to reconstitute the full resolution image.

There are many examples of related prior art in this field. U.S. Pat. No. 5,488,374 (Frankot, et al.) discloses a pyramid decomposition-based noise reduction method that uses simple linear noise filters tuned for each pyramid level. U.S. Pat. No. 5,526,446 (Adelson, et al.) teaches using steerable noise filters within a pyramid decomposition-based architecture. U.S. Pat. No. 5,729,631 (Wober, et al.) reveals using Wiener filters and discrete cosine transforms to noise reduce in the spatial frequency domain within the framework of a pyramid decomposition. U.S. Pat. No. 5,963,676 (Wu, et al.) describes using wavelet decomposition to accomplish its pyramid decomposition and then using an edge-preserving smoothing filter to perform noise reduction at each pyramid level. U.S. Patent Application Publication No. 2002/0118887 (Gindele) discloses a pyramid decomposition-based noise reduction method that uses modified sigma filters tuned for each pyramid level.

A significant problem with existing noise reduction methods is that they are still very computationally intensive when either the image to be noise reduced is very large (e.g. 14 million pixels) or the noise signal is very large with respect to the genuine image signal. When the image consists of a large number of pixels, the required computing resources scales directly with the number of pixels to noise reduce. Using a pyramid decomposition architecture addresses this liability to some extent. When the amount of noise present is large, then generally more complex noise reduction algorithms, such as median filters, must be imbedded into the pyramid architecture to avoid seriously degrading genuine image information. A double jeopardy situation can exist when both circumstances are present.

What is needed is a method that provides the noise reduction capability of a pyramid decomposition approach without relying on complex noise reduction operations at each level of the pyramid so as to keep the required computational intensity to a minimum. This method must still noise reduce in an effective manner when dealing with images with high levels of noise.

SUMMARY OF THE INVENTION

The object of the present invention is to provide a pyramid noise decomposition method which efficiently reduces noise in large digital color images.

This object is achieved in a method of removing noise from a color digital image, comprising the steps of:

(a) receiving an original color digital image including a plurality of pixels represented in a primary-color space;

(b) producing at least one residual digital image and at least one base digital image from the original color digital image, the base digital image having a lower spatial resolution then the original color digital image;

(c) producing a noise reduced base digital image by removing noise from the residual image and the base digital image with a noise reduction filter and combining the noise reduced base digital image with the noise reduced residual image to produce a reconstructed digital image having reduced noise;

(d) transforming the reconstructed digital image into a luminance-chrominance color space;

(e) repeating steps (b) and (c) on the luminance-chrominance digital image to produce a reconstructed luminance-chrominance digital image; and (f) transforming the reconstructed luminance-chrominance digital image into a noise reduced digital image in the original primary color space.

It is a feature of the present invention to provide an improved computationally efficient way to reduce noise in color digital images that are noisy.

It has been found that by decomposing original color digital into base and residual images and then noise-reducing each of them significant improvements can be made in noise reduction.

DETAILED DESCRIPTION OF THE INVENTION

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware and/or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, the computer program can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program.

Before describing the present invention, it facilitates understanding to note that the present invention is preferably utilized on any well-known computer system, such a personal computer. Consequently, the computer system will not be discussed in detail herein. It is also instructive to note that the images are either directly input into the computer system (for example by a digital camera) or digitized before input into the computer system (for example by scanning an original, such as a silver halide film).

Figure 1:
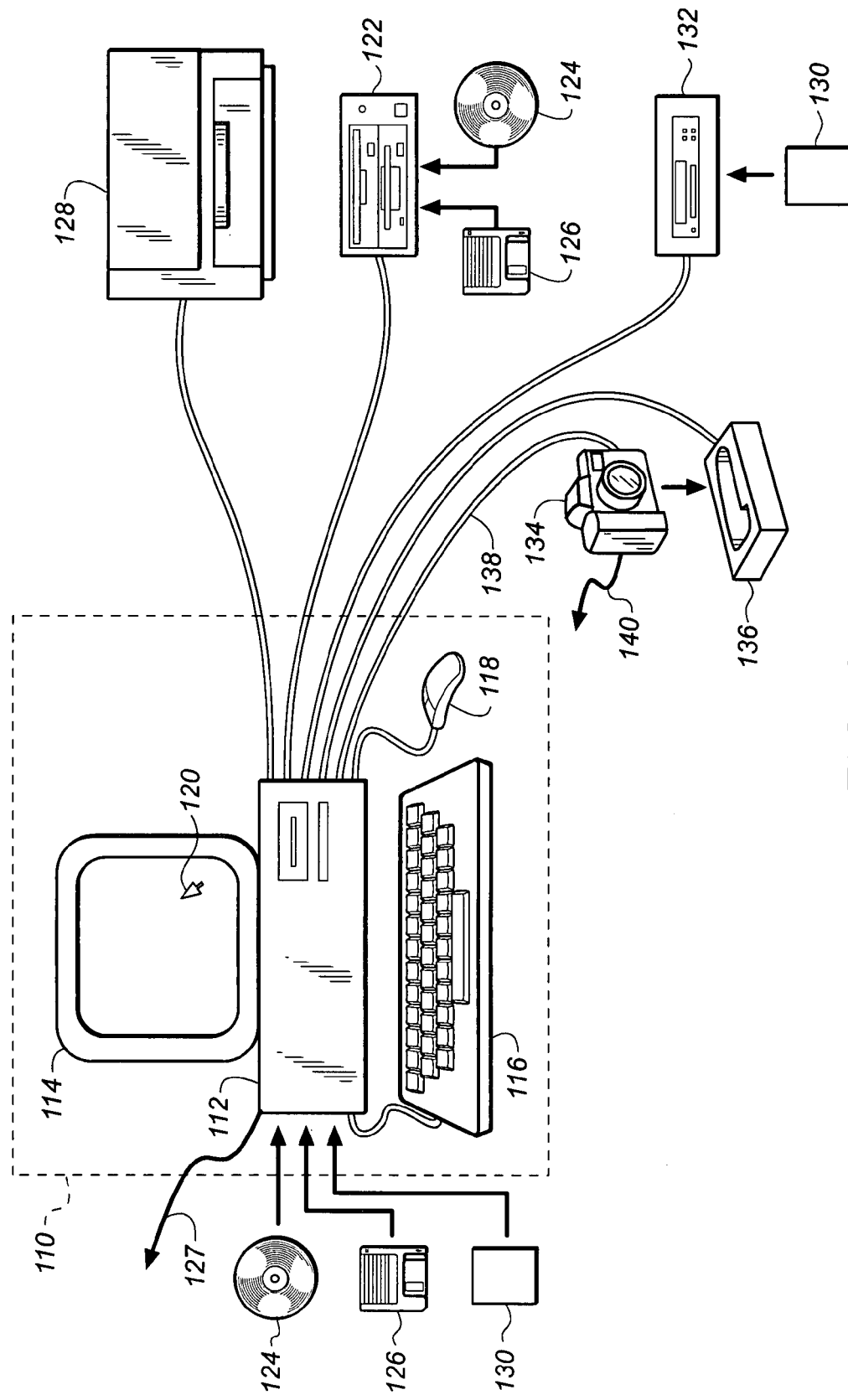
FIG. 1 is a schematic of a computer system for practicing the present invention.

Referring to FIG. 1, there is illustrated a computer system 110 for implementing the present invention. Although the computer system 110 is shown for the purpose of illustrating a preferred embodiment, the present invention is not limited to the computer system 110 shown, but can be used on any electronic processing system such as found in home computers, kiosks, retail or wholesale photo finishing, or any other system for the processing of digital images. The computer system 110 includes a microprocessor-based unit 112 for receiving and processing software programs and for performing other processing functions. A display 114 is electrically connected to the microprocessor-based unit 112 for displaying user-related information associated with the software, e.g., by means of a graphical user interface. A keyboard 116 is also connected to the microprocessor based unit 112 for permitting a user to input information to the software. As an alternative to using the keyboard 116 for input, a mouse 118 can be used for moving a selector 120 on the display 114 and for selecting an item on which the selector 120 overlays, as is well known in the art.

A compact disk-read only memory (CD-ROM) 124, which typically includes software programs, is inserted into the microprocessor based unit 112 for providing a means of inputting the software programs and other information to the microprocessor based unit 112. In addition, a floppy disk 126 can also include a software program, and is inserted into the microprocessor-based unit 112 for inputting the software program. The compact disk-read only memory (CD-ROM) 124 or the floppy disk 126 can alternatively be inserted into externally located disk drive unit 122 which is connected to the microprocessor-based unit 112. Still further, the microprocessor-based unit 112 can be programmed, as is well known in the art, for storing the software program internally. The microprocessor-based unit 112 can also have a network connection 127, such as a telephone line, to an external network, such as a local area network or the Internet. A printer 128 can also be connected to the microprocessor-based unit 112 for printing a hardcopy of the output from the computer system 110.

Images can also be displayed on the display 114 via a personal computer card (PC card) 130, such as, as it was formerly known, a PCMCIA card (based on the specifications of the Personal Computer Memory Card International Association) which contains digitized images electronically embodied in the card 130. The PC card 130 is ultimately inserted into the microprocessor based unit 112 for permitting visual display of the image on the display 114. Alternatively, the PC card 130 can be inserted into an externally located PC card reader 132 connected to the microprocessor-based unit 112. Images can also be input via the compact disk 124, the floppy disk 126, or the network connection 127. Any images stored in the PC card 130, the floppy disk 126 or the compact disk 124, or input through the network connection 127, can have been obtained from a variety of sources, such as a digital camera (not shown) or a scanner (not shown). Images can also be input directly from a digital camera 134 via a camera docking port 136 connected to the microprocessor-based unit 112 or directly from the digital camera 134 via a cable connection 138 to the microprocessor-based unit 112 or via a wireless connection 140 to the microprocessor-based unit 112.

In accordance with the invention, an algorithm can be stored in any of the storage devices heretofore mentioned and applied to images in order to noise reduce the images.

Figure 2:
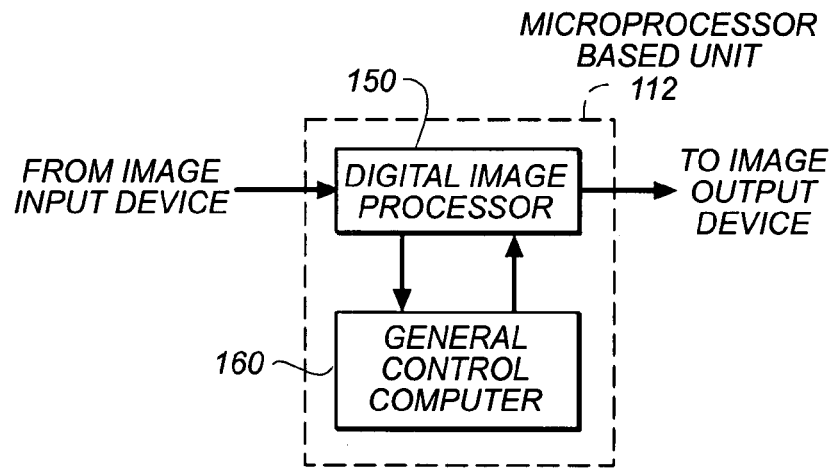
FIG. 2 is a block diagram of the microprocessor-based unit shown in FIG. 1.

Referring to FIG. 2, the microprocessor-based unit 112 is divided into two subsections: the digital image processor 150 which is responsible for the actual operations performed on the image to be noise reduced, and the general control computer 160 that performs the non-image processing tasks of the microprocessor-based unit 112.

Figure 3:
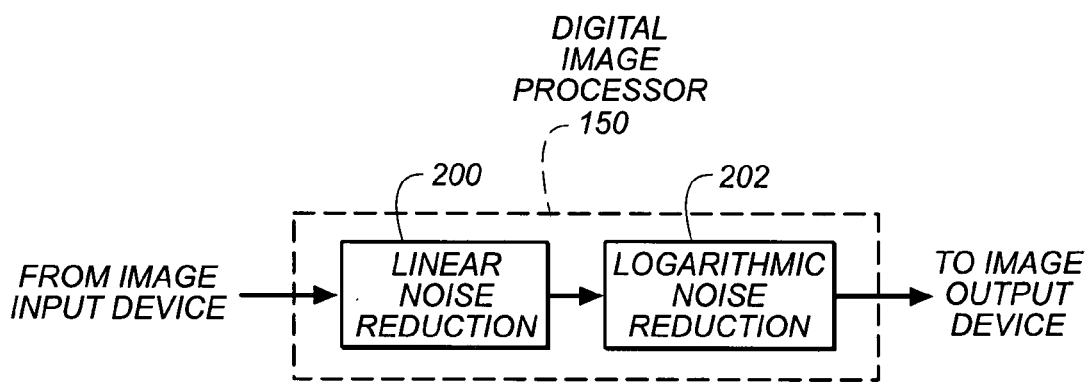
FIG. 3 is a block diagram showing the sequence of linear-space noise reduction and logarithmic-space noise reduction.

FIG. 3 is a high level block diagram of the preferred embodiment. The input image is first noise reduced in its linear, primary-color space 200. Examples of typical primary-color spaces are red-green-blue (RGB) and cyan-magenta-yellow (CMY). The result of this operation is then noise reduced a second time in a logarithmic (log), luminance-chrominance space 202. The luminance-chrominance space used by the preferred embodiment will be described below. The result of this second noise reduction is the final noised reduced image produced by the preferred embodiment of the present invention.

Figure 4A:
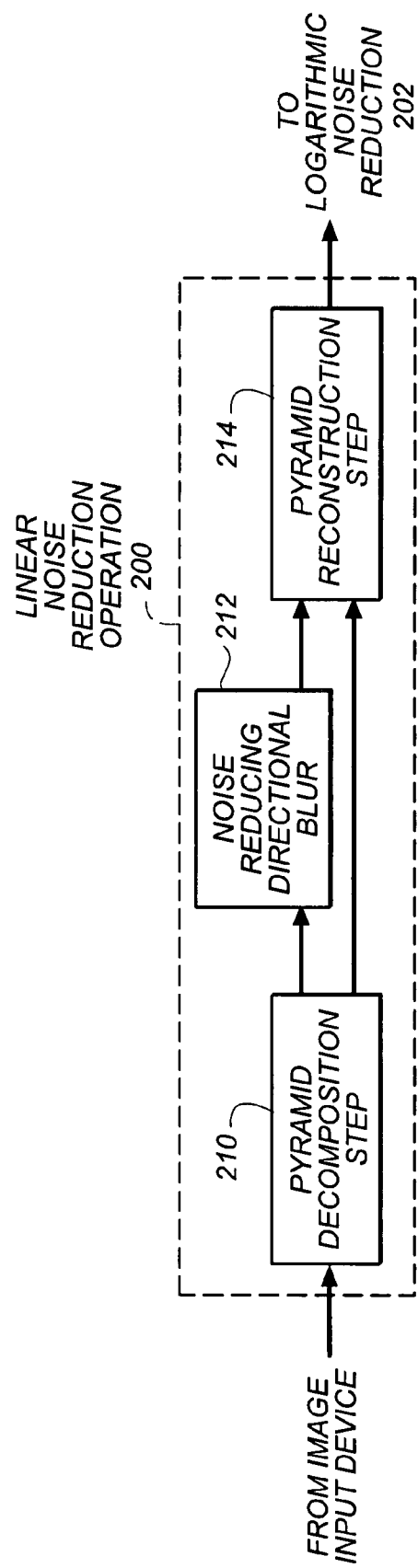
FIG. 4A is a block diagram of the linear-space noise reduction process.
Figure 5:
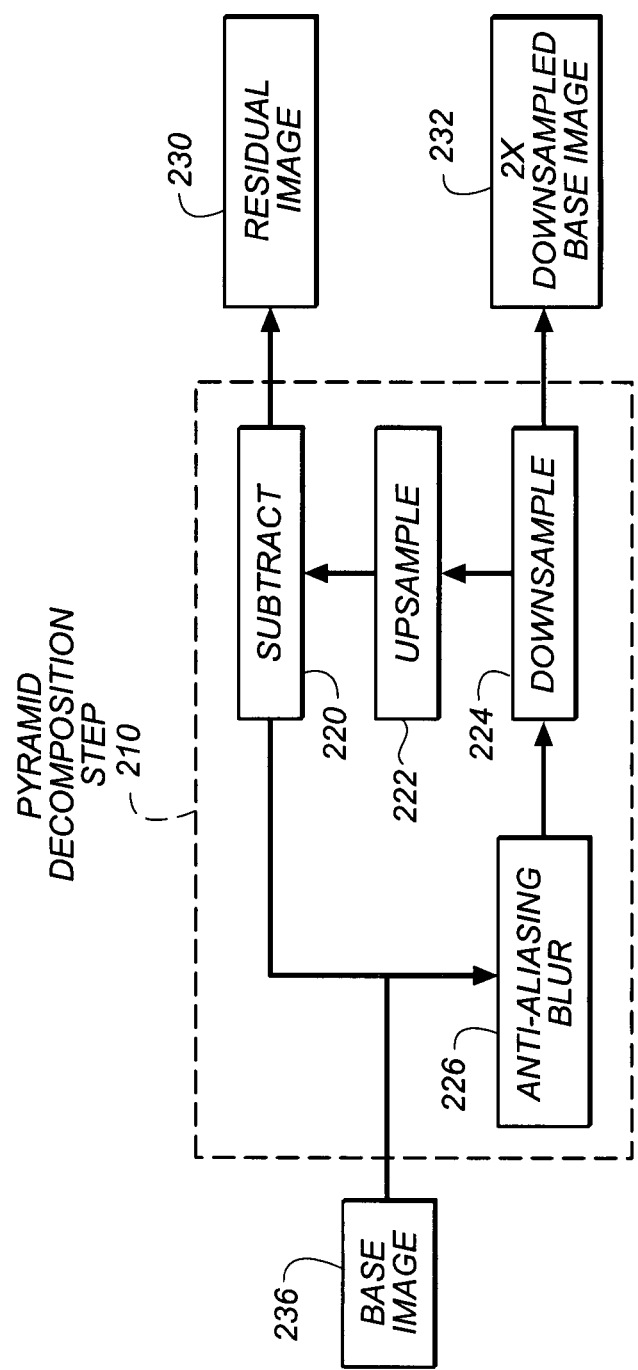
FIG. 5 is a block diagram of a pyramid decomposition process in accordance with the present invention.

Referring to FIG. 4A, the linear, primary-color space noise reduction operation 200 is subdivided into a pyramid decomposition step 210, a noise reducing directional blur operation 212, and a pyramid reconstruction step 214. FIG. 5 is a detailed diagram of the pyramid decomposition step 210 used in the preferred embodiment. The process begins by applying an anti-aliasing blur 226 to the initial base image 236. Block 236 could either be the original image to be noise reduced, or the 2× downsampled base image 232 produce by a previous application of block 210 (see FIG. 9, to be discussed later). In the preferred embodiment, the blurring process 226 consists of convolving each individual color plane of the base image with following blur kernel:

$$\frac{1}{16}\begin{pmatrix} 1 & 2 & 1 \\ 2 & 4 & 2 \\ 1 & 2 & 1 \end{pmatrix}$$

The resulting blurred image is then downsampled by a factor of two in both the horizontal and the vertical directions 224. The preferred embodiment performs the downsampling 224 by subsampling the image in a manner that discards every other row and every other column. The resulting image of this downsampling operation 224 becomes the base image for the next level of the pyramid decomposition process 232. Returning to the pyramid decomposition process 210, a copy of the output of the downsampling operation 224 is next upsampled by a factor of two in both the horizontal and vertical directions 222. In the preferred embodiment the up sampling 222 is accomplished by inserting a new row of zeros between each existing row in the output of the downsampling operation 224 and by inserting a new column of zeros between each existing column in the output of the downsampling operation 224. In order to determine the preferred pixel values within these new rows and columns, a convolution is performed with the following convolution kernel:

$$\frac{1}{256}\begin{pmatrix} 1 & 0 & -9 & 0 & -9 & 0 & 1 \\ 0 & 0 & 0 & 0 & 0 & 0 & 0 \\ -9 & 0 & 81 & 0 & 81 & 0 & -9 \\ 0 & 0 & 0 & 256 & 0 & 0 & 0 \\ -9 & 0 & 81 & 0 & 81 & 0 & -9 \\ 0 & 0 & 0 & 0 & 0 & 0 & 0 \\ 1 & 0 & -9 & 0 & -9 & 0 & 1 \end{pmatrix}$$

This kernel will leave the pixel values in the original rows and columns unaltered and will interpolate the pixel values in the new rows and columns using bicubic interpolation. The resulting upsampled image is then subtracted from the original base image 220. This results in the residual image 230 associated with the current level of the pyramid decomposition.

Returning to FIG. 4A, the image from the input device will be designated as I0. The residual image 230 resulting from the pyramid decomposition step 210 will be designated as R0. The new 2× downsampled base image 232 resulting from the pyramid decomposition step 210 will be designated as I1. In FIG. 4A, R0 is passed to the noise reducing directional blur operator 212. I1 is passed directly to the pyramid reconstruction step 214.

Figure 4B:
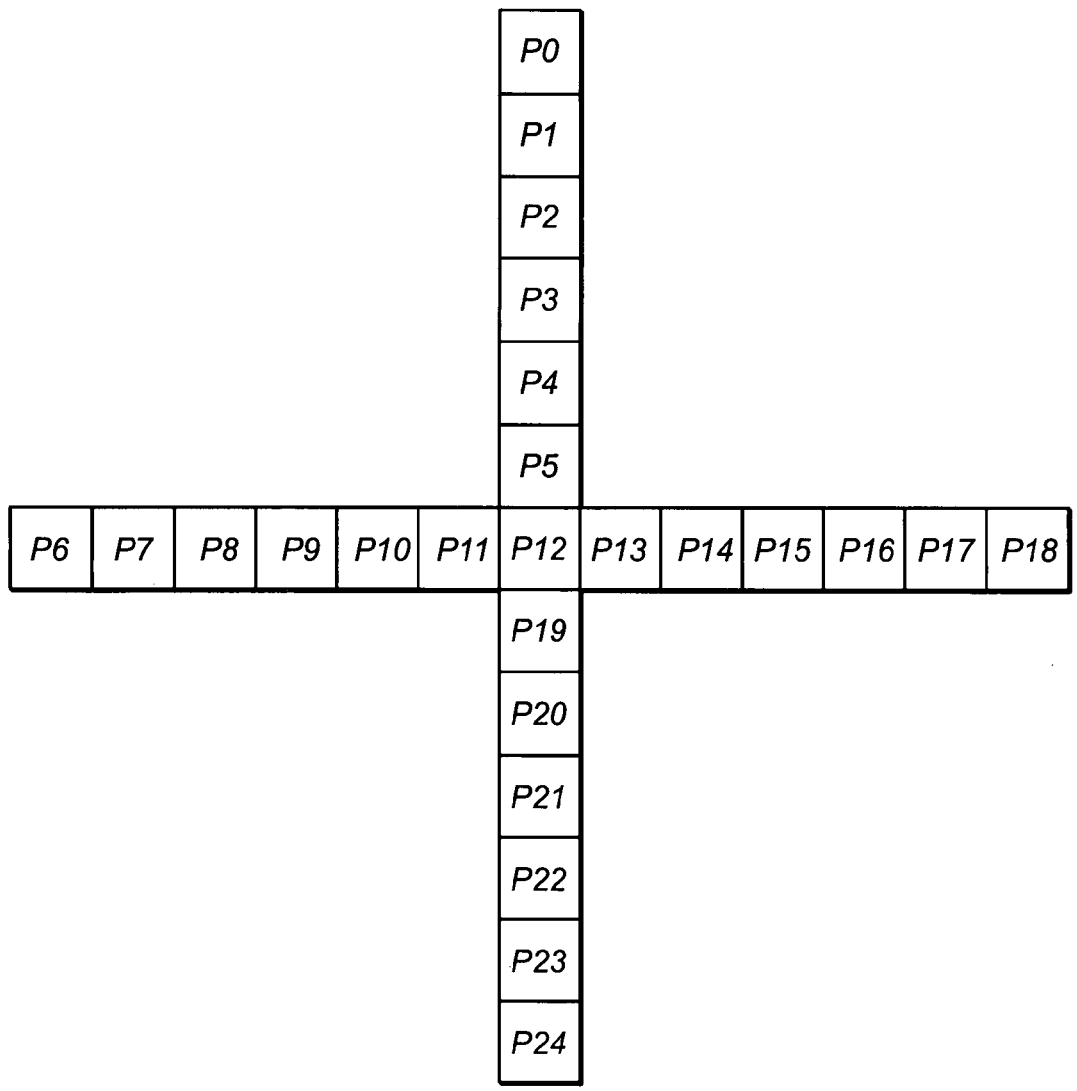
FIG. 4B depicts a directional blur filter neighborhood of pixels.

The noise reducing directional blur operation 212 in the preferred embodiment is based on a 13×13 cross pixel neighborhood as shown in FIG. 4B. In the preferred embodiment a different portion of the 13×13 cross neighborhood is used for each color channel. In the case of an RGB image, the blue channel uses the full 13×13 cross neighborhood. The red channel uses the central 9×9 cross neighborhood, i.e., {P2, P3, P4, P5, P8, P9, P10, P11, P12, P13, P14, P15, P16, P19, P20, P21, P22}. The green channel uses the central 3×3 cross neighborhood: {P5, P11, P12, P13, P19}. The first step of the noise reducing directional blur operation 212 for a given pixel neighborhood is to compute horizontal and vertical classifier values. For the red channel the classifiers would be $$\begin{cases} h = 2|(P_8 + 2P_9 + P_{10}) - (P_{14} + 2P_{15} + P_{16})| + \\ \quad |2(P_{11} + 2P_{12} + P_{13}) - (P_8 + 2P_9 + P_{10}) - (P_{14} + 2P_{15} + P_{16})| \\ v = 2|(P_2 + 2P_3 + P_4) - (P_{20} + 2P_{21} + P_{22})| + \\ \quad |2(P_5 + 2P_{12} + P_{19}) - (P_2 + 2P_3 + P_4) - (P_{20} + 2P_{21} + P_{22})| \end{cases}$$

For the green channel the classifiers would be $$\begin{cases} h = 2|P_{11} - P_{13}| + |P_{11} + 2P_{12} + P_{13}| \\ v = 2|P_5 - P_{19}| + |P_5 + 2P_{12} + P_{19}| \end{cases}.$$

For the blue channel the classifiers would be $$\begin{cases} h = 2|(P_6 + 2P_7 + P_8) - (P_{16} + 2P_{17} + P_{18})| + \\ \quad |2(P_{11} + 2P_{12} + P_{13}) - (P_6 + 2P_7 + P_8) - (P_{16} + 2P_{17} + P_{18})| \\ v = 2|(P_1 + 2P_2 + P_3) - (P_{22} + 2P_{23} + P_{24})| + \\ \quad |2(P_5 + 2P_{12} + P_{19}) - (P_1 + 2P_2 + P_3) - (P_{22} + 2P_{23} + P_{24})| \end{cases}.$$

The two classifiers are then compared and the direction with the smaller classifier value is chosen as the preferred direction of blurring. In the preferred direction of blurring a one-dimensional blur kernel is used for producing the appropriate blurred pixel value. For the red channel the blur kernel is $$\frac{1}{256} (1\ 8\ 28\ 56\ 70\ 56\ 28\ 8\ 1).$$

For the green channel the blur kernel is $$\frac{1}{4} (1\ 2\ 1).$$

For the blue channel the blur kernel is $$\frac{1}{4096} (1\ 12\ 66\ 220\ 495\ 792\ 924\ 792\ 495\ 220\ 66\ 12\ 1).$$

Each blurred pixel value is mixed with the original pixel value to produce the final result of the direction blur 212. The mixing method is a weighted average with the following weights:

$$\begin{cases} R_M = 0.6R_O + 0.4R_B \\ G_M = 0.8G_O + 0.2G_B \\ B_M = 0.3B_O + 0.7B_B \end{cases}.$$

In this expression, R=red, G=green, and B=blue. The subscript O=original, subscript B=blurred, and subscript M=mixed.

Figure 6:
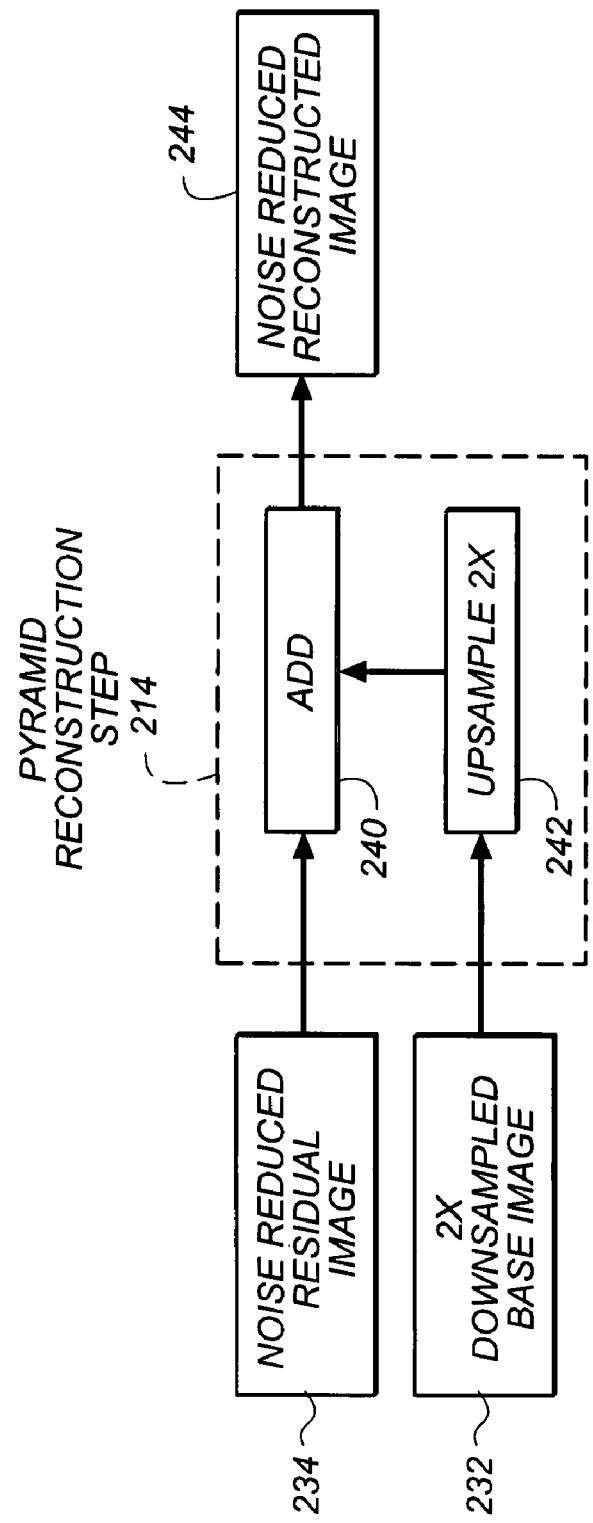
FIG. 6 is a block diagram of a pyramid reconstruction process in accordance with the present invention.

FIG. 6 shows the pyramid reconstruction step 214. The noise reduced residual image 234 is the output of the directional blur operation 212. The 2× downsampled base image 232 is one of the outputs of the pyramid is to upsample the downsampled base image 242. The identical up sampling process used in block 222 is used in block 242. The upsampled image is then added 240 to the noise reduced residual image 234. The result is the noise reduced reconstructed image 244.

Figure 7:
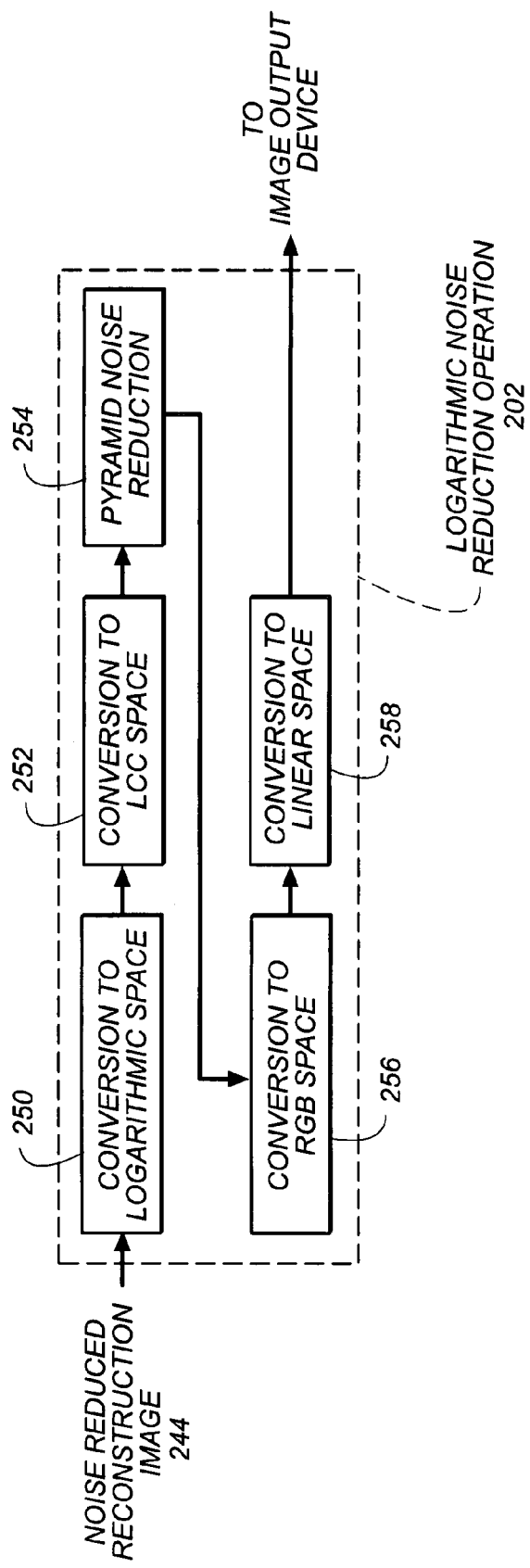
FIG. 7 is a block diagram of a logarithmic-space noise reduction process.

FIG. 7 shows the next step in the preferred embodiment, i.e., the log space noise reduction of the image 202. This step begins by converting the noise reduced reconstructed image 244 in a logarithm space 250. The logarithmic transform used in the preferred embodiment is $$y = 2500[\log_{10}(x+100) - 2]$$

wherein
y is the transformed code value; and
x is the original code value.

Each color channel of the image is transformed. The log space image is next converted to a luminance-chrominance (LCC) space representation 252. The transform for the preferred embodiment, which assumes an RGB image, is $$\begin{cases} Y = G \\ C_1 = \dfrac{2G - R - B}{4} \\ C_2 = \dfrac{B - R}{2} \end{cases}$$

where R=red, G=green, B=blue, Y=luma, $C_1$=the first chroma channel, and $C_2$=the second chroma channel. The image, now in a logarithm luminance-chrominance space, is now noise reduced within a pyramid noise reduction decomposition/reconstruction framework 254 to be described below. Once noise reduced, the image is converted back to RGB space 256 with the following transform:

$$\begin{cases} R = Y - 2C_1 - C_2 \\ G = Y \\ B = Y - 2C_1 + C_2 \end{cases}.$$

Finally, the RGB image is converted back to linear space 258 with the following transform:

$$x = 100(10^{\frac{y}{2500}} - 1).$$

It is noted that the transform of block 258 is the inverse of the transform of block 250. Similarly, the transform of block 256 is the inverse of the transform of block 252.

Figure 8:
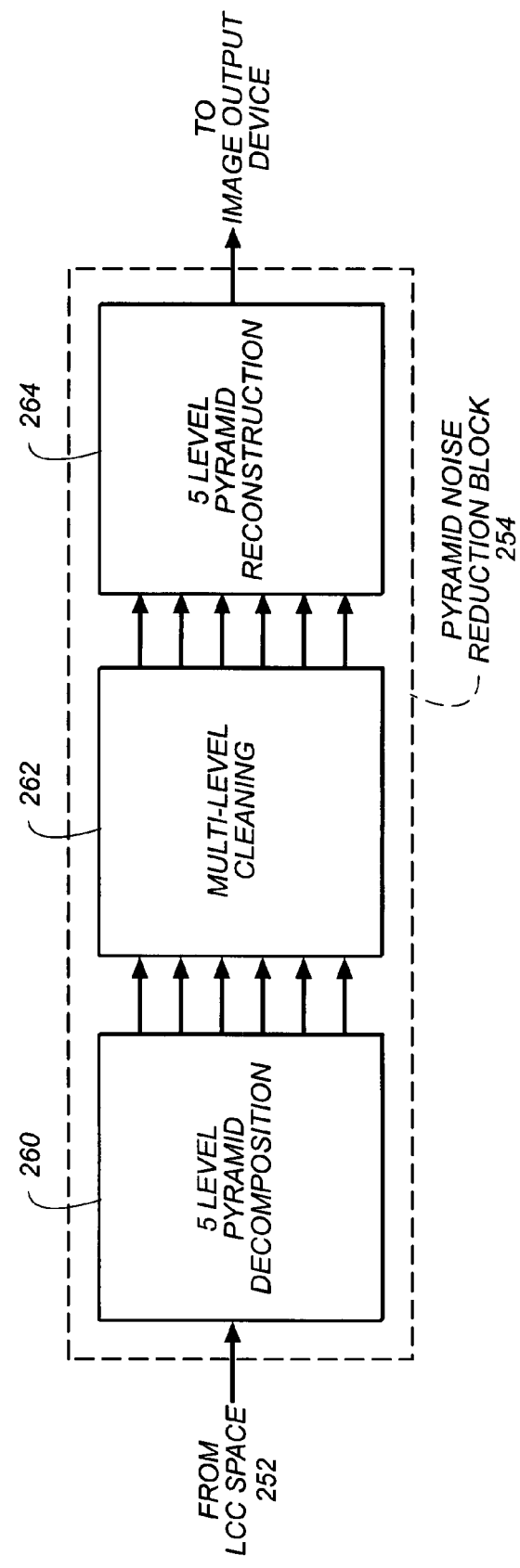
FIG. 8 is a block diagram of a pyramid noise reduction process.
Figure 9:
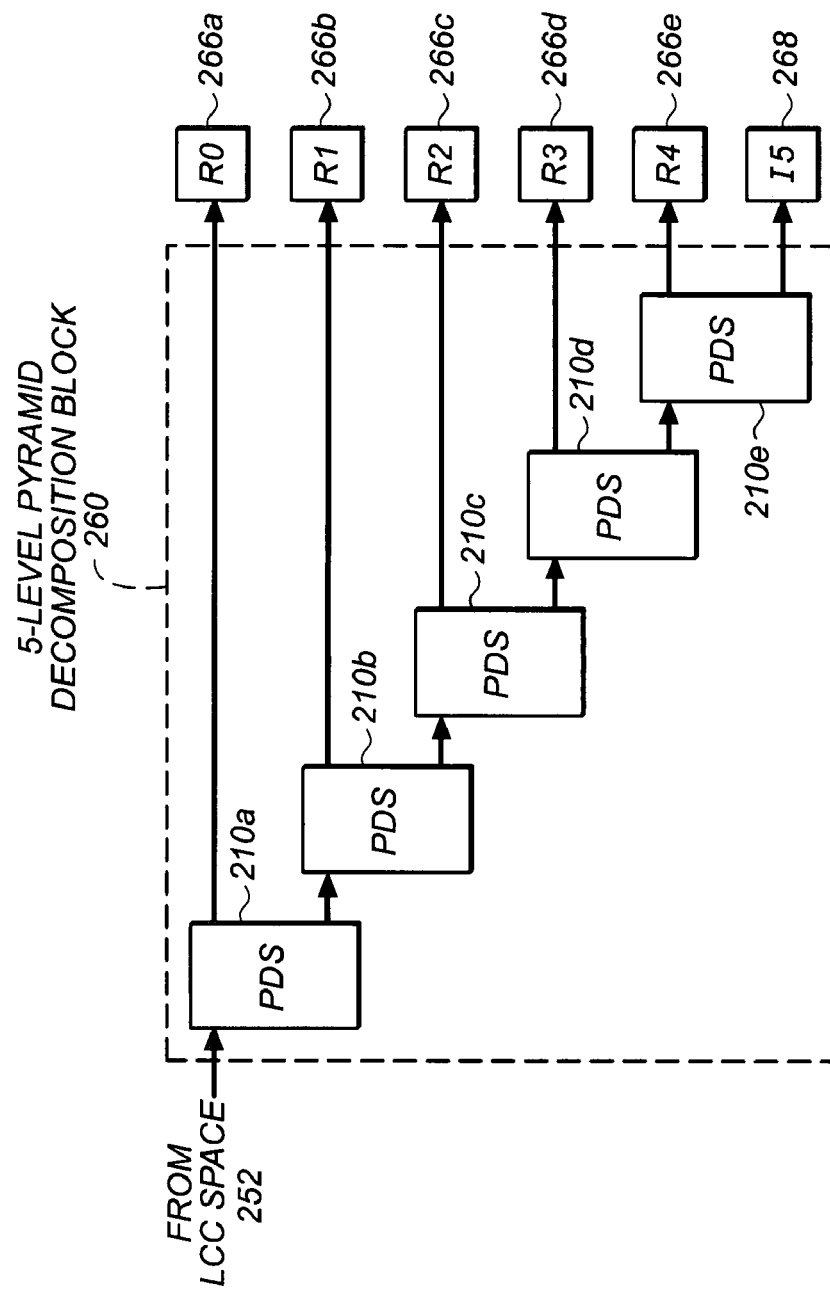
FIG. 9 is a block diagram of a 5-level pyramid decomposition process.

The details of the pyramid noise reduction 254 are given in FIG. 8. The first step is a 5-level pyramid decomposition 260 of the image from block 252 (FIG. 7). The details of block 260 are shown in FIG. 9. The previously described pyramid decomposition step 210 is executed sequentially five times 210*a-e*. The results are five residuals images (R0-R4) 266*a-e* as well as a lowest resolution base image (I5) 268.

Figure 10:
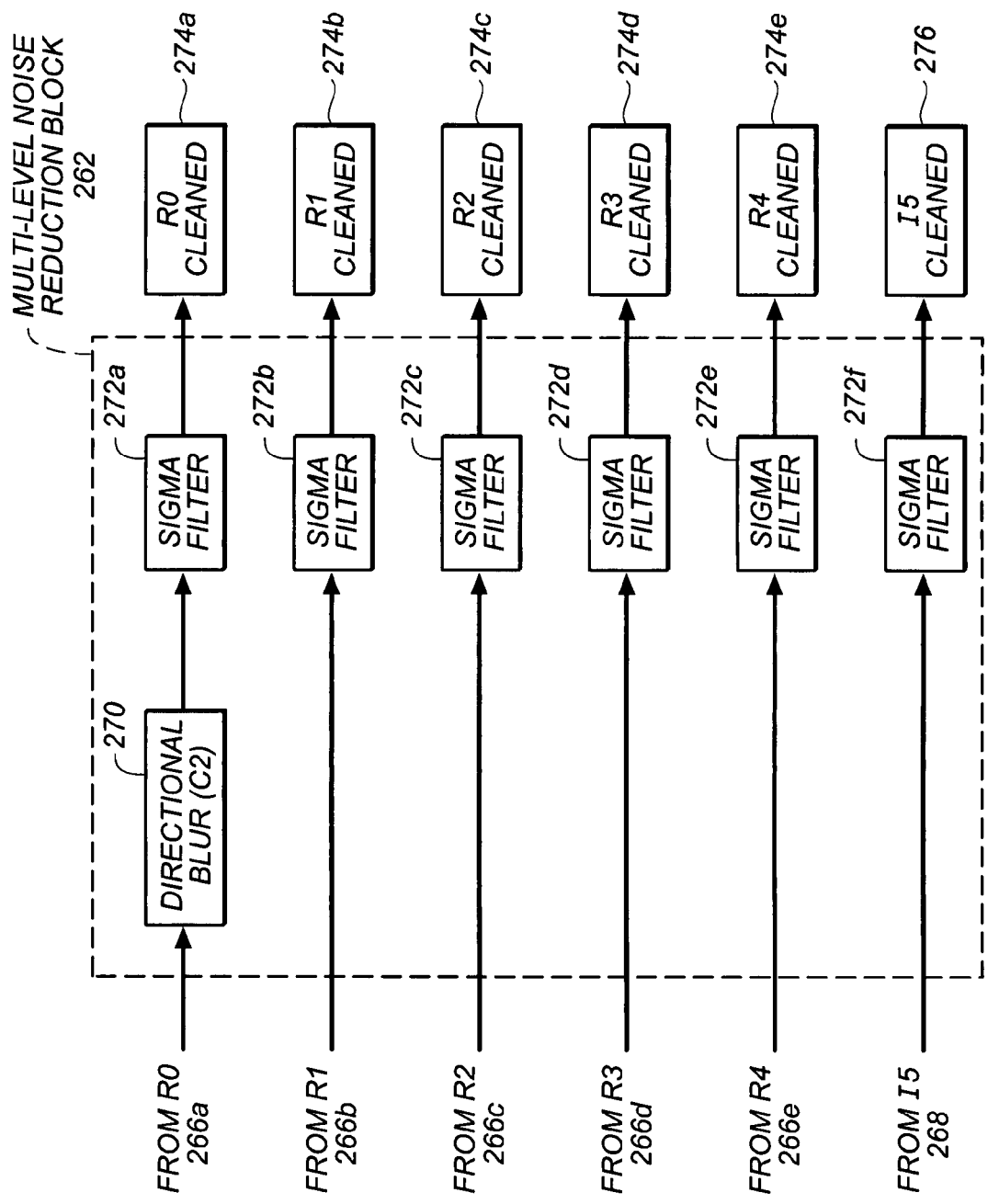
FIG. 10 is a block diagram of a multilevel noise reduction process.

Returning to FIG. 8, the output of the 5-level pyramid decomposition 260 is sent to the multi-level noise reduction step 262. The details of block 262 are shown in FIG. 10. The noise reduction of the first residual image (R0) 266*a* is different from the other input components 266*b-e*, 268. The first step to noise reduction block 266*a* is to perform a directional blur on the second chroma channel, $C_2$, 270. The details of block 270 are similar to block 212 (FIG. 4A) with the following exceptions. A 5×5 cross neighborhood is used for noise reducing the $C_2$ channel. This corresponds to pixels {P4, P5, P10, P11, P12, P13, P14, P19, P20} in FIG. 4B. The classifiers for block 270 are $$\begin{cases} h = |P_{10} + P_{11} - P_{13} - P_{14}| + |2P_{12} - P_{10} - P_{14}| \\ v = |P_4 + P_5 - P_{19} - P_{20}| + |2P_{12} - P_4 - P_{20}| \end{cases}$$

wherein
h is the horizontal classifier; and
v is the vertical classifier.

The blur kernel used for block 270 is $$\frac{1}{16}(1 \quad 4 \quad 6 \quad 4 \quad 1).$$

The blurred value is mixed with the original value using the following expression:

$$C_{2M} = \frac{1}{2}C_{2O} + \frac{1}{2}C_{2B}.$$

Once block 270 is complete, the chroma channels of the resulting image are noise reduced with a sigma filter 272a. (The luma channel is left unchanged.) The sigma filter 272a uses a 7×7 square pixel neighborhood. In a well-known variant of the sigma filter, the scaled difference in pixel values between each pixel in the neighborhood and the central pixel is computed and then weighted by a gaussian weighting function. In the preferred embodiment, which assumes 12-bit pixel values, the weighting function w(y) is $$w(y) = \left\lfloor 1000 e^{\frac{y^2}{2}} + \frac{1}{2} \right\rfloor, 0 \leq y \leq 4095$$

This weighting function evaluates to {1000, 607, 135, 11, 0 . . . }, i.e., only the first four values are nonzero. The scaled difference pixel values are computed with the following expressions:

$$\begin{cases} \Delta_{C_1 j} = |C_{1j} - C_{1i}|/T_{C_1} \\ \Delta_{C_2 j} = |C_{2j} - C_{2i}|/T_{C_2} \end{cases}$$

where i refers to the central pixel in the neighborhood, j refers to pixel within the neighborhood, $C_1$ and $C_2$ are the pixel chroma values, $T_{C1}$ and $T_{C2}$ are thresholds that have been determined ahead of time to tune the overall aggressiveness of the noise reduction process, and $\Delta_{C1j}$ and $\Delta_{C2j}$ are the resulting scaled pixel differences. In order to preserve the overall hue of the pixel being noise reduced, the maximum scaled pixel difference is determined:

$$\delta_j = \max\{\Delta_{C_1 j}, \Delta_{C_2 j}\}$$

where $\delta_j$ is the maximum scaled pixel difference for the jth pixel in the neighborhood. Once $\delta_j$ has been determined for each pixel in the neighborhood, a weighted average is performed:

$$\begin{cases} C'_{1i} = \dfrac{\sum_{j=1}^{49} w(\delta_j) C_{1j}}{\sum_{j=1}^{49} w(\delta_j)} \\ \\ C'_{2i} = \dfrac{\sum_{j=1}^{49} w(\delta_j) C_{2j}}{\sum_{j=1}^{49} w(\delta_j)} \end{cases}$$

where $C_{1i}'$ and $C_{2i}'$ are the noise reduced chroma values of the resulting central pixel in the neighborhood. These noise reduced chroma channels in combination with the corresponding unaltered luma channel become the noise reduced R0 residual 274a. Blocks 272b-f are identical to block 272a and are used to noise reduce residual images 266b-e and base image 268. The resulting noise reduced residuals images are blocks 274b-e and the resulting base image is block 276.

Figure 11:
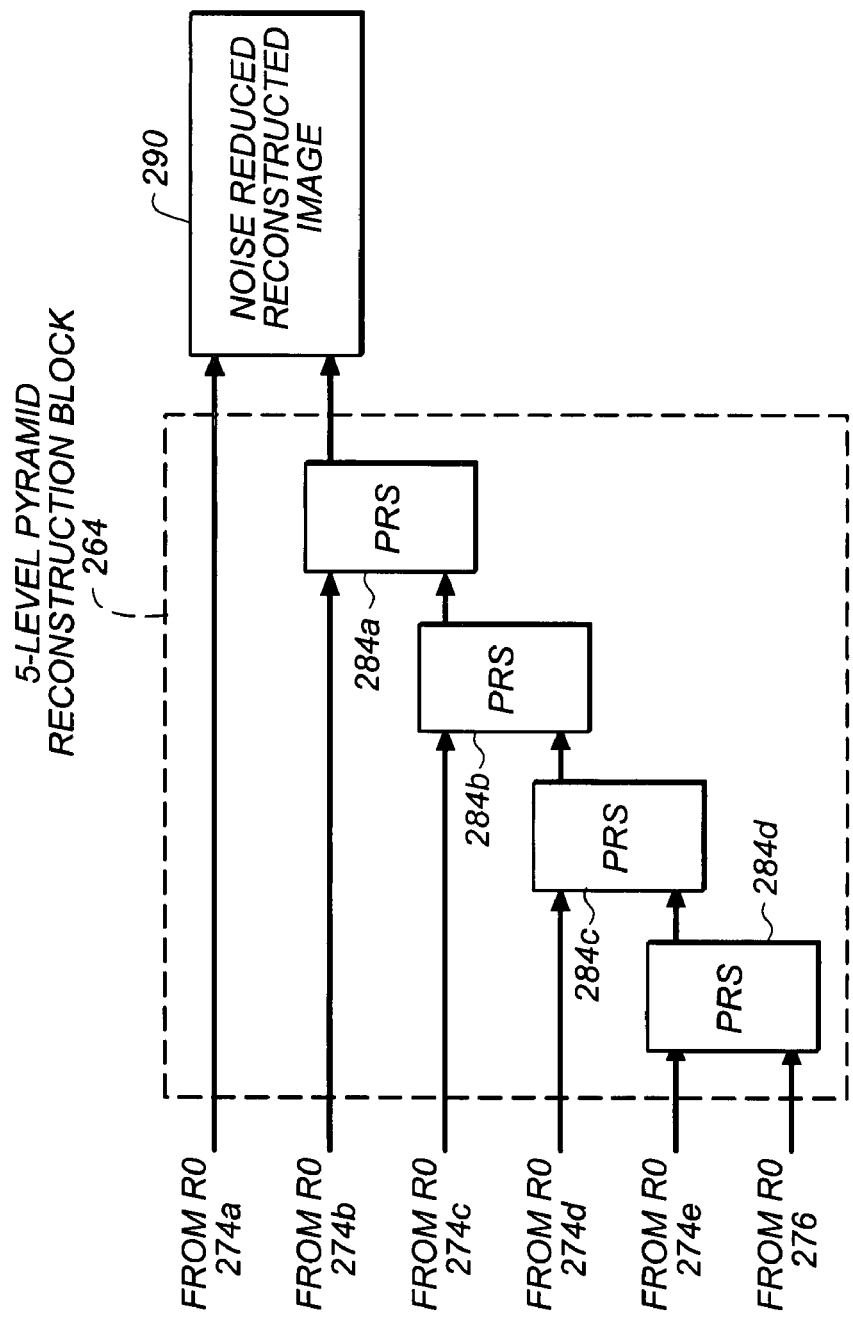
FIG. 11 is a block diagram of a 5-level pyramid reconstruction process.

Returning to FIG. 8, the noise reduced images 274a-e, 276 are used to reconstruct the final image 264. FIG. 11 presents the details of the reconstruction process 264. Each pyramid reconstruction step (PRS) 284a-d is identical to block 214 (FIG. 4A) which has been previously described. The resulting noise reduced reconstructed image is block 290.

The noise reduction algorithm disclosed in the preferred embodiment of the present invention can be employed in a variety of user contexts and environments. Exemplary contexts and environments include, without limitation, wholesale digital photo finishing (which involves exemplary process steps or stages such as film in, digital processing, prints out), retail digital photo finishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or scanned output), mobile devices (e.g., PDA or cell phone that can be used as a processing unit, a display unit, or a unit to give processing instructions), and as a service offered via the World Wide Web.

In each case, the algorithm can stand alone or can be a component of a larger system solution. Furthermore, the interfaces with the algorithm, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the algorithm itself can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithm can interface with a variety of workflow user interface schemes.

The algorithm disclosed herein in accordance with the invention can have interior components that utilize various data detection and reduction techniques (e.g., face detection, eye detection, skin detection, flash detection).

The invention has been described in detail with particular reference to certain preferred embodiments thereof, but it will be understood that variations and modifications can be effected within the spirit and scope of the invention.

PARTS LIST

110 Computer System
112 Microprocessor-based Unit
114 Display
116 Keyboard
118 Mouse
120 Selector on Display
122 Disk Drive Unit
124 Compact Disk-read Only Memory (CD-ROM)
126 Floppy Disk
127 Network Connection
128 Printer
130 Personal Computer Card (PC card)
132 PC Card Reader
134 Digital Camera
136 Camera Docking Port
138 Cable Connection
140 Wireless Connection
150 Digital Image Processor
160 General Control Computer
200 Linear Noise Reduction Operation
202 Logarithmic Noise Reduction Operation
210 Pyramid Decomposition Step
212 Noise Reducing Directional Blur Operation
214 Pyramid Reconstruction Step
220 Image Subtraction Operation
222 Up sampling Operation
224 Downsampling Operation
226 Anti-Aliasing Blurring Operation Parts List Cont'd
230 Residual Image
232 2× Downsampled Base Image
234 Noise Reduced Residual Image
236 Base Image
240 Image Addition Operation
242 Upsampling Operation
244 Noise Reduced Reconstructed Image
250 Conversion to Log Space Operation
252 Conversion to Luminance-Chrominance Space Operation
254 Pyramid Noise Reduction Block
256 Conversion to RGB Space Operation
258 Conversion to Linear Space Operation
260 5-Level Pyramid Decomposition Block
262 Multi-Level Noise Reduction Block
264 5-Level Pyramid Reconstruction Block
266 Residual Image
268 Base Image
270 Directional Blur of C2 Channel Operation
272 Sigma Filter Noise Noise Reduction Operation
274 Noise Reduced Residual Image
276 Noise-Reduced Base Image
284 Pyramid Reconstruction Block
290 Noise Reduced Reconstructed Image

What is claimed is:

1. A method of removing noise from a color digital image, comprising the steps of:
   (a) receiving an original color digital image including a plurality of pixels represented in a primary-color space;
   (b) producing at least one residual digital image and at least one base digital image from the original color digital image, the base digital image having a lower spatial resolution then the original color digital image;
   (c) producing a noise reduced digital image by removing noise from the residual image and the base digital image with a noise reduction filter and combining the noise reduced base digital image with the noise reduced residual image to produce a reconstructed digital image having reduced noise;
   (d) transforming the reconstructed digital image into a luminance-chrorninance color space;
   (e) repeating steps (b) and (c) on the luminance-chrominance digital image to produce a reconstructed luminance-chrominance digital image; and
   (f) transforming the reconstructed luminance-chrominance digital image into a noise reduced digital image in the original primary color space.

2. The method of claim 1 wherein the primary-color space is red, green, and blue (RGB).

3. The method of claim 2 wherein the luminance-color space is defined by the transform $$\begin{cases} Y = G \\ C_1 = \dfrac{2G - R - B}{4} \\ C_2 = \dfrac{B - R}{2} \end{cases}.$$

wherein
Y is luminance;
C1 is first chrominance channel; and
C2 is second chrominance channel.

4. The method of claim 1 wherein the residual and base digital images are the components of a Laplacian pyramid image decomposition.

5. The method of claim 1 wherein element (d) includes a logarithmic transform $$y=2500[\log_{10}(x+100)-2]$$

wherein
y is the transformed code value; and
x is the original code value.

6. The method of claim 1 wherein the noise reduction employs a direction blurring operation.

7. The method of claim 1 wherein the noise reduction filter includes a sigma filter.

* * * * *

UNITED STATES PATENT AND TRADEMARK OFFICE
CERTIFICATE OF CORRECTION

PATENT NO. : 7,257,271 B2
APPLICATION NO. : 10/738658
DATED : August 14, 2007
INVENTOR(S) : James E. Adams, Jr. et al.

It is certified that error appears in the above-identified patent and that said Letters Patent is hereby corrected as shown below:

Claim 1, Column 12, Line 21     In Claim 1, delete "chrorninance" and insert -- chrominance --

Signed and Sealed this

Eleventh Day of March, 2008

JON W. DUDAS
*Director of the United States Patent and Trademark Office*